US012774938B2

(12) United States Patent
Huang et al.

(10) Patent No.: US 12,774,938 B2
(45) Date of Patent: Oct. 27, 2026

(54) TRANSMISSION DEVICE AND STATE MONITORING METHOD OF TRANSMISSION STRUCTURE THEREOF

(71) Applicant: Industrial Technology Research Institute, Hsinchu (TW)

(72) Inventors: Li-Te Huang, Hsinchu (TW); Cheng-Ping Yang, Hsinchu (TW); Chih-Hsuan Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 586 days.

(21) Appl. No.: 18/153,902

(22) Filed: Jan. 12, 2023

(65) Prior Publication Data

US 2023/0221172 A1 Jul. 13, 2023

Related U.S. Application Data

(60) Provisional application No. 63/298,639, filed on Jan. 12, 2022.

(30) Foreign Application Priority Data

Nov. 30, 2022 (TW) .................................. 111146040

(51) Int. Cl.
*F16H 57/01* (2012.01)
*G01H 1/00* (2006.01)
(Continued)

(52) U.S. Cl.
CPC .......... *G01M 13/021* (2013.01); *F16H 57/01* (2013.01); *G01H 1/003* (2013.01); *G01K 13/08* (2013.01);
(Continued)

(58) Field of Classification Search
CPC ...... G01H 1/00–16; G01K 13/00–252; G01M 13/00–045; F16H 57/00–128
See application file for complete search history.

(56) References Cited

U.S. PATENT DOCUMENTS 6,289,735 B1 9/2001 Dister et al.
6,802,221 B2 * 10/2004 Hedeen ............... G01M 13/045 73/660
(Continued)

FOREIGN PATENT DOCUMENTS

CN 203230608 U 10/2013
CN 112129523 A * 12/2020 .......... G01M 13/021
(Continued)

OTHER PUBLICATIONS

Office Action issued in Taiwanese Application No. 111146040, dated Jul. 31, 2023, with English partial translation.
(Continued)

*Primary Examiner* — Judy Nguyen
*Assistant Examiner* — James Split
(74) *Attorney, Agent, or Firm* — HSML P.C.

(57) ABSTRACT

A transmission device is provided and includes a transmission structure and a circuit board, where the circuit board is disposed on an input end of the transmission structure, and a sensing element and a data processing element communicatively connected to the sensing element are integrated on the circuit board to perform signal measurement operations.

10 Claims, 5 Drawing Sheets

(51) Int. Cl.
*G01K 13/08* (2006.01)
*G01M 13/021* (2019.01)
*G01M 13/028* (2019.01)

(52) U.S. Cl.
CPC ..... *G01M 13/028* (2013.01); *F16H 2057/018* (2013.01)

(56) References Cited

U.S. PATENT DOCUMENTS

| | | | | |
|---|---|---|---|---|
| 7,256,505 | B2 * | 8/2007 | Arms | H02J 7/32 290/1 R |
| 7,764,958 | B2 * | 7/2010 | Townsend | H04L 1/0045 455/423 |
| 8,171,797 | B2 * | 5/2012 | Hatch | G01M 13/021 702/34 |
| 8,929,022 | B1 * | 1/2015 | Huang | G11B 5/5552 360/78.05 |
| 10,819,137 | B2 * | 10/2020 | Khoche | G01K 1/024 |
| 11,143,632 | B2 * | 10/2021 | Araki | G01H 17/00 |
| 11,776,329 | B2 * | 10/2023 | Kraus | B60Q 9/00 701/50 |
| 2011/0166738 | A1 | 7/2011 | Tsukasaki et al. | |
| 2011/0301752 | A1 | 12/2011 | Finezilber | |
| 2022/0128594 | A1 * | 4/2022 | Murata | H02K 11/20 |

FOREIGN PATENT DOCUMENTS

| | | | |
|---|---|---|---|
| CN | 112665856 | A | 4/2021 |
| KR | 100791787 | B1 | 1/2008 |
| KR | 20110122483 | A | 11/2011 |
| KR | 20150090950 | A | 8/2015 |
| TW | M410012 | U | 8/2011 |
| TW | 201339848 | A | 10/2013 |
| TW | I414919 | B | 11/2013 |
| TW | I476387 | B | 3/2015 |
| TW | 201609293 | A | 3/2016 |
| TW | I605259 | B | 11/2017 |
| TW | 202008161 | A | 2/2020 |
| TW | M612190 | U | 5/2021 |
| TW | 202133542 | A | 9/2021 |

OTHER PUBLICATIONS

Office Action issued in Chinese Application No. 2022116324927, mailed Apr. 24, 2025, with machine translation.

* cited by examiner

TRANSMISSION DEVICE AND STATE MONITORING METHOD OF TRANSMISSION STRUCTURE THEREOF

BACKGROUND

1. Technical Field

The present disclosure relates to a monitoring mechanism, and more particularly, to a transmission device and a state monitoring method of a transmission structure of the transmission device.

2. Description of Related Art

In response to the rise of Industry 4.0, many factories are transforming to digital, so as to measure and quantify machine signals, which can be used as a diagnostic basis for follow-up health indicators.

There are no sensing elements added to the existing industrial gearboxes, and multiple sensors need to be plugged in for measurement operations. However, for measurement by plug-in, it is necessary to consider the installation space and sensor wiring path, and the conventional wired accelerometers cannot achieve the effect of remote monitoring, so that a special hardware is required to receive signals.

Moreover, most of the existing diagnosis methods establish a fault database via experimental rules, or design parameters to calculate the characteristic frequency. However, both of them require a lot of analysis time, and analysts need to have relevant technical backgrounds, and ordinary field operators cannot quickly define the fault phenomenon.

Therefore, how to overcome the various deficiencies of the above-mentioned conventional technologies has become a difficult problem to be overcome urgently in the industry.

SUMMARY

In view of the above-mentioned problems of the prior art, the present disclosure provides a transmission device, comprising: a transmission structure having an input end and an output end opposing the input end; a circuit board disposed on the input end of the transmission structure; a sensing element disposed on the circuit board; and a data processing element disposed on the circuit board and communicatively connected to the sensing element.

The present disclosure further provides a state monitoring method of a transmission structure, comprising: providing the aforementioned transmission device; sensing a plurality of vibration signals of the transmission structure via the sensing element; converting the plurality of vibration signals into a frequency spectrum signal via the data processing element; and comparing the frequency spectrum signal with a comparison signal to determine whether the transmission structure is abnormal, wherein the comparison signal is a normal frequency spectrum presented by the vibration signals generated by the transmission structure in a normal state.

DETAILED DESCRIPTIONS

The following describes the implementation of the present disclosure with examples. Those familiar with the art can easily understand the other advantages and effects of the present disclosure from the content disclosed in this specification.

It should be understood that, the structures, ratios, sizes, and the like in the accompanying figures are used to illustrate the content disclosed in the present disclosure for one skilled in the art to read and understand, rather than to limit the conditions for practicing the present disclosure. Any modification of the structure, alteration of the ratio relationship, or adjustment of the size without affecting the possible effects and achievable proposes should still fall in the range compressed by the technical content disclosed in the present disclosure. Meanwhile, terms such as "on," "a," "one," and the like used herein are merely used for clear explanation rather than limiting practical range by the present disclosure, and thus, the alteration or adjustment of relative relationship thereof without altering the technical content should be considered in the practical scope of the present disclosure.

Figure 1:
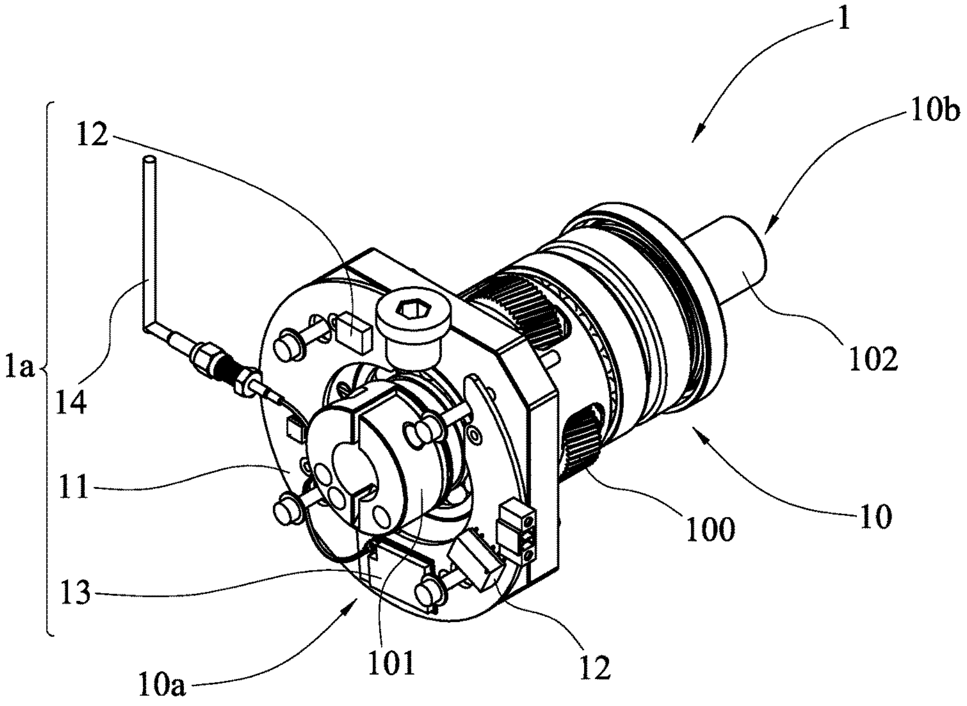
FIG. 1 is a schematic perspective view of a transmission device according to the present disclosure.

FIG. 1 is a schematic perspective view of a transmission device 1 according to the present disclosure. As shown in FIG. 1, the transmission device 1 comprises: a transmission structure 10, a circuit board 11, at least one sensing element 12 and a data processing element 13.

The transmission structure 10 is provided with an input end 10*a* and an output end 10*b* opposing the input end 10*a*.

In an embodiment, the transmission structure 10 is a deceleration structure (such as a gear set of a deceleration box or a gear box) and includes a plurality of gears 100. For example, the gear set may include ring gears, planetary/epicyclic gears, sun gears, or other gears, among others.

Furthermore, the input end 10*a* of the transmission structure 10 has an input shaft 101 that couples the plurality of gears 100, and the output end 10*b* of the transmission structure 10 has an output shaft 102 that couples the plurality of gears 100, so that the input shaft 101 couples the output shaft 102 via the plurality of gears 100. For example, the input shaft 101 can be connected to a motor such as a power source, and the output shaft 102 can be connected to a tool such as a drill bit.

It should be understood that there are various types of the transmission structure 10, as long as it can transmit power, it is not limited to the above.

The circuit board 11 is disposed on the input end 10*a* of the transmission structure 10. In an embodiment, the circuit board 11 is ring-shaped to surround the input shaft 101. It should be understood that the shape of the circuit board 11 can be designed according to requirements, as long as it can be arranged on the input end 10*a*, there is no special limitation.

The sensing element 12 is disposed on the circuit board 11. In an embodiment, the sensing element 12 is an accelerometer or a temperature sensor.

The data processing element 13 is disposed on the circuit board 11 and communicatively connected to the sensing element 12.

In an embodiment, the data processing element 13 is a microcontroller (micro controller unit or MCU).

Furthermore, the transmission device 1 further comprises a data transmission element 14 that is communicatively connected to the data processing element 13. For example, the data transmission element 14 is in the form of an antenna to transmit the processing result of the data processing element 13 to an electronic device such as a computer (not shown).

Also, the data transmission element 14 is disposed on the circuit board 11, so that the circuit board 11, the sensing element 12, the data processing element 13 and the data transmission element 14 are integrated into an electronic module 1*a*, that is, modularized. It should be understood that the power required by the electronic module 1*a* can come from a battery installed on the circuit board 11 or from an external power supply.

Therefore, in the transmission device 1 of the present disclosure, the circuit board 11, the sensing element 12 (accelerometer and/or temperature sensor), the data processing element 13, the data transmission element 14 (e.g., Wi-Fi antenna), and even the power supply are integrated into a single electronic module 1*a*, so as to be placed in the input end 10*a* of the transmission structure 10, so that the required data can be obtained effectively, and the service life of the electronic module 1*a* can be improved. For instance, since the rotational speed at the input end 10*a* is relatively high, the vibration signal is the strongest, and it is far away from the high-temperature places of the transmission structure 10 (such as the plurality of gears 100 and the output end 10*b*), so better vibration signals can be obtained, and the service life of the circuit board 11 can be extended.

Figure 2:
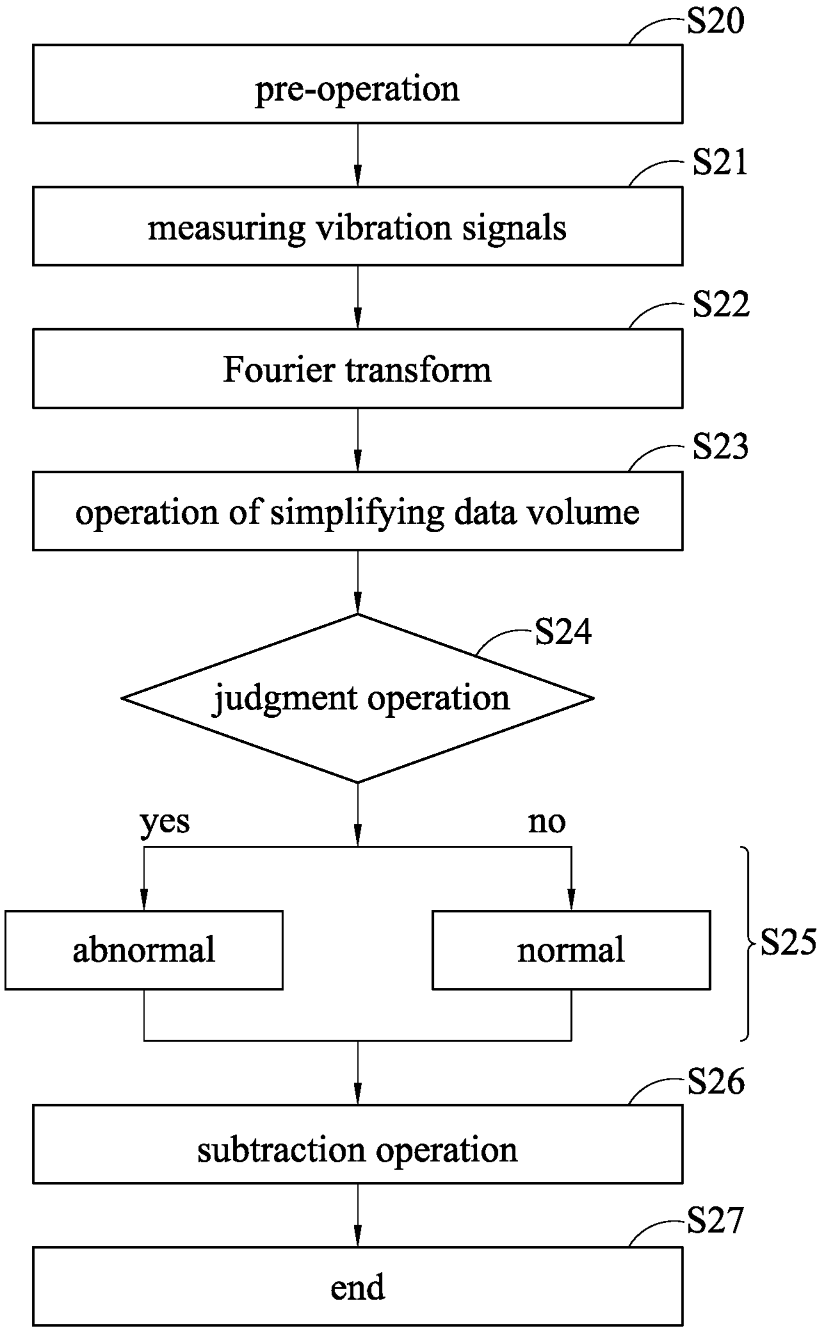
FIG. 2 is a flow chart illustrating a state monitoring method of the transmission structure according to the present disclosure.

FIG. 2 is a flow chart illustrating a state monitoring method of the transmission structure 10 according to the present disclosure. In an embodiment, the state monitoring method is to monitor whether the transmission structure 10 of the transmission device 1 is abnormal.

In step S20, a pre-operation is performed, and the circuit board 11 is communicatively connected to an electronic device such as a computer via the data transmission element 14.

In an embodiment, the circuit board 11 and the computer are set to the same network domain by means of Wi-Fi.

In step S21, the vibration signal is measured, so as to sense a plurality of vibration signals of the transmission structure 10 via the sensing element 12, and the noise is removed.

In an embodiment, the vibration signal is a time-domain signal, so the plurality of vibration signals can be used as vibration time-domain data.

Figure 3A:
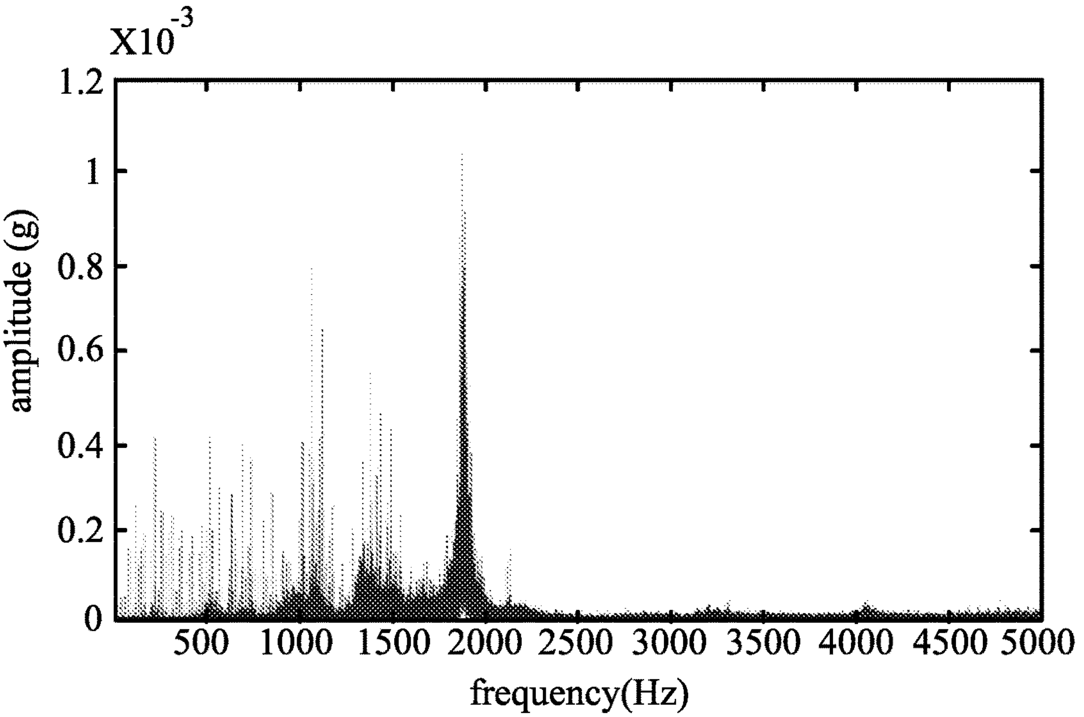
FIG. 3A is a graph of a first frequency spectrum signal before the simplification of the state monitoring method of the transmission structure according to the present disclosure.

In step S22, the plurality of vibration signals are converted into a first frequency spectrum signal via the data processing element 13 (as shown in FIG. 3A).

In an embodiment, the time-domain signal is converted into a frequency-domain signal by using a Fourier transform method such as Fast Fourier Transform (FFT) to display the vibration frequency spectrum.

Figure 3B:
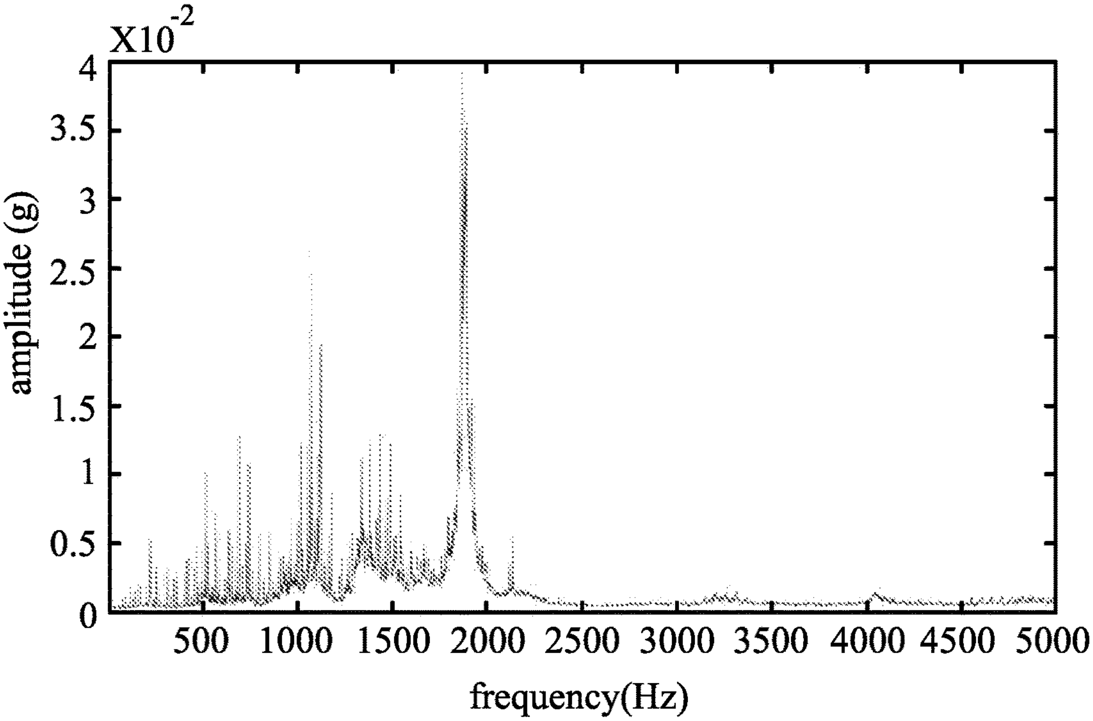
FIG. 3B is a graph of a second frequency spectrum signal after the simplification of the state monitoring method of the transmission structure according to the present disclosure.

In step S23, an operation of simplifying data volume is performed via the data processing element 13 to obtain a second frequency spectrum signal (as shown in FIG. 3B).

In an embodiment, the frequency range is first rounded to an integer, and then the amplitudes of the frequency repeaters are averaged to define a frequency range of 0 to 5000 Hz. For example, the sampling rate is set at 10000 Hz, that is, the amount of data is 10000 data per second, but the frequency calculation does not need to be that precise. Therefore, the frequency is rounded to an integer, and then the frequencies of the same integer are averaged, so the 360,000 original data (the first frequency spectrum signal) shown in FIG. 3A can be reduced to 5,000 (the second frequency spectrum signal) as shown in FIG. 3B, which is about 86% less, thereby reducing storage capacity.

Therefore, the frequencies are integerized and averaged to achieve the effect of reducing the amount of data and retain the frequency signals under the full bandwidth.

In step S24, a judgment operation is carried out to determine whether the transmission structure 10 is abnormal via the computer.

Figure 3C:
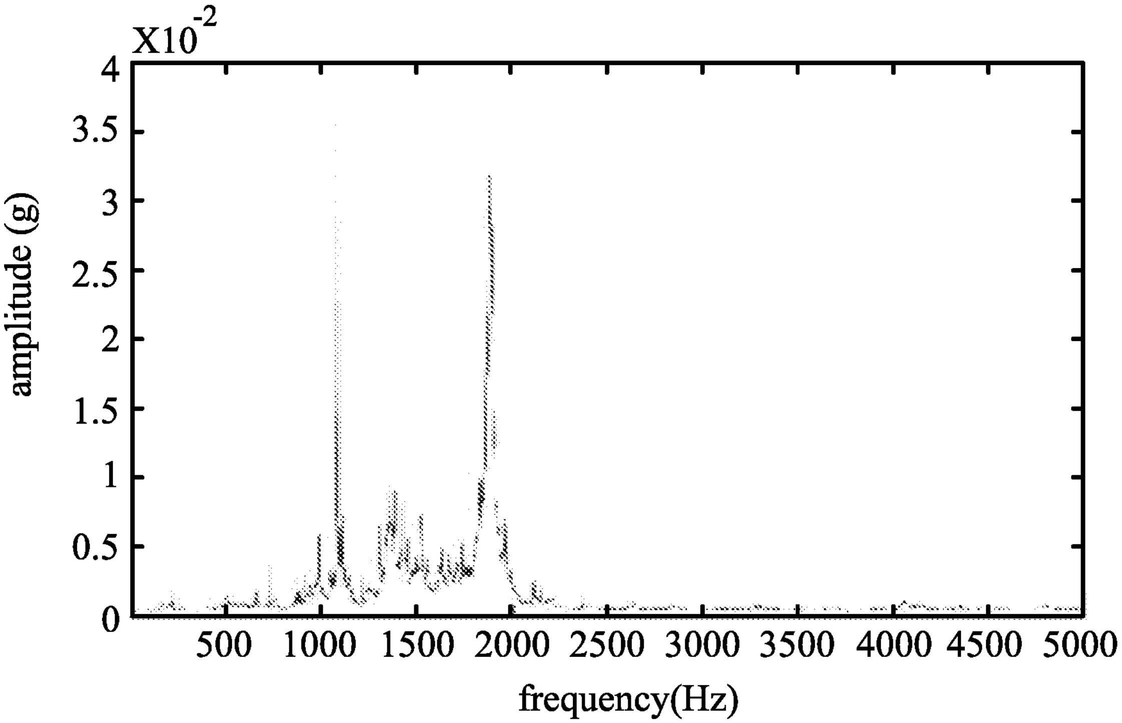
FIG. 3C is a graph of a comparison signal used in the state monitoring method of the transmission structure according to the present disclosure.

In an embodiment, the user manually compares the second frequency spectrum signal (as shown in FIG. 3B) presented by the computer with a comparison signal (as shown in FIG. 3C) to determine whether the transmission structure 10 is abnormal, wherein the comparison signal is a normal frequency spectrum presented by the vibration signals generated by the transmission structure 10 in a normal state. For example, the signal of the normal frequency spectrum can be stored (or built) in a database of the computer first, and the content items accessed by the database can include frequency, amplitude, average amplitude, number of frequencies exceeding the average amplitude, or the like. In another embodiment, the user can also store the "initial operation frequency spectrum" in the computer to an initial database, so that at the end of each operation, the transmission device 1 automatically subtracts the "initial operation frequency spectrum" in the computer, and stores the results of the frequency spectrum dense cluster and the average amplitude threshold, and automatically performs the judgment operation of the abnormality. It should be understood that there are many ways to execute the judgment operation in step S24, which can be performed manually, automatically, or in other suitable ways, and the present disclosure is not limited to the above.

Moreover, based on the comparison signal (signal of normal frequency spectrum), the user can determine whether the transmission structure 10 is abnormal by judging from the computer whether there is a dense cluster of signals. Therefore, whether the transmission structure 10 is abnormal can be known regardless of human judgment or automatic judgment.

In step S25, when there is a dense cluster of signals, it is determined as abnormal. If there is no dense cluster of signals, it is determined as normal.

In an embodiment, when the number N of frequencies exceeding the average amplitude of the frequency spectrum signal (second frequency spectrum signal) is greater than 1.5 times the number M of frequencies exceeding the average amplitude of the signal of the normal frequency spectrum ($N>1.5M$), there will be a dense cluster of signals (that is, a signal defined as an abnormal frequency spectrum).

In step S26, a subtraction operation is carried out, so that when it is determined to be abnormal, the computer can subtract the frequency spectrum signal from the comparison signal to calculate the cause of the abnormality of the transmission structure 10.

Figure 4:
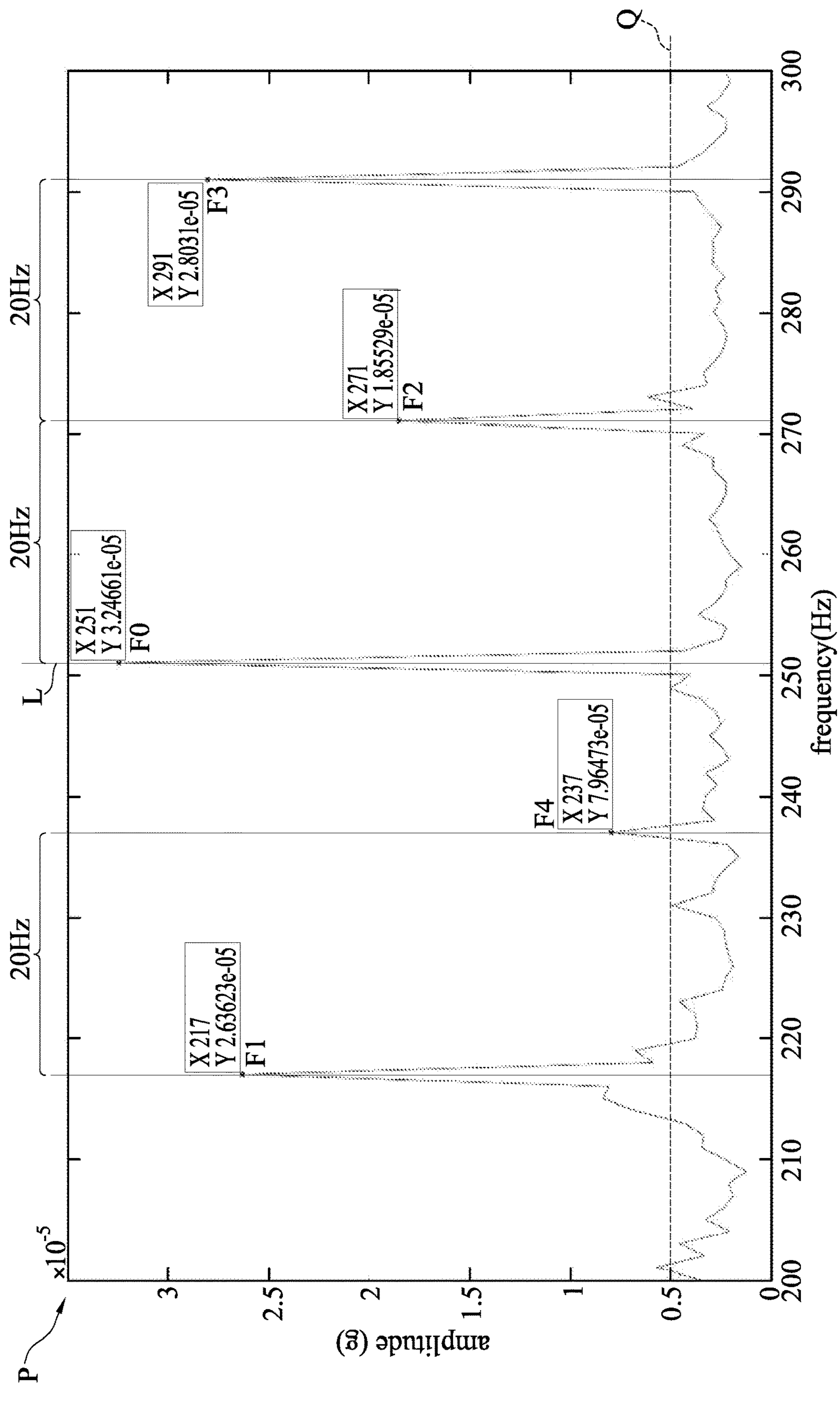
FIG. 4 is a graph of a target frequency spectrum obtained by the state monitoring method of the transmission structure according to the present disclosure.

In an embodiment, the abnormal frequency spectrum (the second frequency spectrum signal shown in FIG. 3B) is subtracted from the normal frequency spectrum (the comparison signal shown in FIG. 3C) to obtain a target frequency spectrum P, as shown in FIG. 4, and then the amplitudes corresponding to the frequency of 0 Hz to 5000 Hz in the target frequency spectrum P are averaged, so as to take the value of the average amplitude as a threshold value Q ($0.5\times10^{-5}$ g as shown in FIG. 4). Then, a theoretical meshing frequency is taken as a reference L (e.g., 251 Hz as shown in FIG. 4), and observe whether there are multiple (at least two) identical distances/pitches (e.g., 20 Hz as shown in FIG. 4) between the peak values F0, F1, F2, F3 and F4 on the left and right sides of the reference L that are higher than the threshold value Q, so that the pitch is used as the target factor to compare and conclude that the cause of failure (or the cause of abnormality) comes from the gears 100 of the input end 10*a*.

Further, the correlation between the cause of failure and the target factor (pitch) is built in the database of the computer, so as long as the pitch is known, an abnormal cause of the transmission structure 10 can be known. For example, the target factor (pitch) is 20 Hz, and the corresponding abnormal cause is defined as "wear of input gear."

Moreover, the reference L can also use the frequency position of the maximum amplitude, but the judgment benefit of using the theoretical meshing frequency is higher.

Therefore, the frequency subtraction method is used, that is, the signal of the normal frequency is subtracted from the signal of the abnormal frequency to obtain the difference, and the difference can be quantified by the pitch and amplitude, that is, first use the meshing frequency (or the highest response frequency) as the reference L, and then search for multiple equal pitches on the left and right sides of the reference L to define the fault phenomenon or element. Therefore, the subtraction operation is applicable to all types of transmission mechanisms.

In step S27, the state monitoring method of the transmission structure 10 ends. In an embodiment, the calculation results can be stored in the database of the computer for reference by subsequent users. For example, when the input condition of the transmission structure 10 is 1200 rpm/80 Nm, the input gear is damaged, and it can be found that the target factor will appear three times at a pitch of 20 Hz near the meshing frequency (216 Hz), and this pitch can be used to define fault items and store them in the database of the computer.

The foregoing embodiments are used for the purpose of illustrating the principles and effects rather than limiting the present disclosure. Anyone skilled in the art can modify and alter the above embodiments without departing from the spirit and scope of the present disclosure. Therefore, the range claimed by the present disclosure should be as described by the accompanying claims listed below.

What is claimed is:

1. A transmission device, comprising:

a transmission structure having an input end and an output end opposing the input end;

a circuit board disposed on the input end of the transmission structure;

a sensing element disposed on the circuit board to sense a plurality of vibration signals of the transmission structure;

a data processing element disposed on the circuit board and communicatively connected to the sensing element to convert the plurality of vibration signals into a first frequency spectrum signal, wherein the data processing element rounds a frequency range of the first frequency spectrum signal to an integer and then averages amplitudes of frequency repeaters to obtain a second frequency spectrum signal; and a data transmission element communicatively connected to the data processing element to transmit the second frequency spectrum signal to a computer, wherein a signal of a normal frequency spectrum is stored in the computer, wherein when a number of frequencies exceeding an average amplitude of the second frequency spectrum signal is greater than 1.5 times a number of frequencies exceeding an average amplitude of the signal of the normal frequency spectrum, the computer defines the second frequency spectrum signal as an abnormal frequency spectrum signal, subtracts the second frequency spectrum signal from the signal of the normal frequency spectrum to obtain a target frequency spectrum, averages amplitudes corresponding to frequencies from 0 Hz to 5000 Hz in the target frequency spectrum, and takes an average value of the amplitudes of the target frequency spectrum as a threshold value to determine an abnormal cause of the transmission structure.

2. The transmission device of claim 1, wherein the transmission structure is a deceleration structure.

3. The transmission device of claim 2, wherein the deceleration structure is in a form of a gear set.

4. The transmission device of claim 1, wherein the input end of the transmission structure has an input shaft, and the output end of the transmission structure has an output shaft.

5. The transmission device of claim 1, wherein the circuit board, the data processing element and the sensing element are integrated into an electronic module.

6. The transmission device of claim 1, wherein the sensing element is an accelerometer or a temperature sensor.

7. The transmission device of claim 1, wherein the data processing element is a microcontroller.

8. The transmission device of claim 1, wherein the data transmission element is in a form of an antenna.

9. The transmission device of claim 1, wherein the data transmission element is disposed on the circuit board, and the circuit board, the data processing element, the sensing element and the data transmission element are integrated into an electronic module.

10. A state monitoring method of a transmission structure, comprising:

providing a transmission device comprising the transmission structure having an input end and an output end opposing the input end, a circuit board disposed on the input end of the transmission structure, a sensing element disposed on the circuit board, and a data processing element disposed on the circuit board and communicatively connected to the sensing element;

sensing a plurality of vibration signals of the transmission structure via the sensing element;

converting the plurality of vibration signals into a first frequency spectrum signal via the data processing element, wherein a frequency range of the first frequency spectrum signal is rounded to an integer and then amplitudes of frequency repeaters are averaged via the data processing element to obtain a second frequency spectrum signal; and comparing the second frequency spectrum signal with a comparison signal to determine whether the transmission structure is abnormal, wherein the comparison signal is a normal frequency spectrum presented by the vibration signals generated by the transmission structure in a normal state, wherein when a number of frequencies exceeding an average amplitude of the second frequency spectrum signal is greater than 1.5 times a number of frequencies exceeding an average amplitude of a signal of a normal frequency spectrum, the second frequency spectrum signal is defined as an abnormal frequency spectrum signal, wherein the second frequency spectrum signal is subtracted from the comparison signal to obtain a target frequency spectrum, amplitudes corresponding to frequencies from 0 Hz to 5000 Hz in the target frequency spectrum are averaged, and an average value of the amplitudes of the target frequency spectrum is taken as a threshold value to determine an abnormal cause of the transmission structure.

* * * * *